United States Patent
McKinnon

(10) Patent No.: US 6,851,567 B2
(45) Date of Patent: Feb. 8, 2005

(54) METER BOX LID AND HOLDER

(76) Inventor: James Stephen McKinnon, 1009 Clear Lake Ct., Colleyville, TX (US) 76034

( * ) Notice: Subject to any disclaimer, the term of this patent is extended or adjusted under 35 U.S.C. 154(b) by 0 days.

(21) Appl. No.: 10/103,066

(22) Filed: Mar. 21, 2002

(65) Prior Publication Data

US 2003/0178425 A1 Sep. 25, 2003

(51) Int. Cl.$^7$ ................................................. B65D 51/18
(52) U.S. Cl. ................................. 220/254.3; 340/870.02
(58) Field of Search ........................... 220/254.3, 254.7, 220/254.8, 38, 4.02, 521, 522, 212; 340/870.02

(56) References Cited

U.S. PATENT DOCUMENTS

| | | | |
|---|---|---|---|
| 859,363 A | * 7/1907 | Bossert | 220/3.8 |
| 2,034,472 A | * 3/1936 | Kesslinger | 220/522 |
| 2,038,218 A | * 4/1936 | Holt | 220/522 |
| 4,163,503 A | 8/1979 | McKinnon | |
| D257,133 S | 9/1980 | McKinnon | |
| 5,298,894 A | * 3/1994 | Cerny et al. | 340/870.02 |
| 5,825,303 A | * 10/1998 | Bloss et al. | 340/870.02 |

* cited by examiner

*Primary Examiner*—Lien Ngo
(74) *Attorney, Agent, or Firm*—Geoffrey A. Mantooth; Arthur F. Zobal

(57) ABSTRACT

The meter box lid has an opening extending between its top and bottom sides with a door movable to an open or closed position. Also provided is a U-shaped shelf or holder which can be removably coupled to the bottom side of the lid for forming a cavity below the bottom side of the lid for holding a transponder for meter reading purposes such that the lid without the holder can be provided to users who do not use transponders or with the holder to users who use transponders for meter reading purposes.

4 Claims, 3 Drawing Sheets

METER BOX LID AND HOLDER

BACKGROUND OF THE INVENTION

1. Field of the Invention

The invention relates to a meter box lid and a holder for holding a transponder to the lid.

2. Description of the Prior Art

Meter box lids have been employed for holding transponders for enabling personnel to read water meters from a distance without leaving the utility truck. The transponders used comprise a disc for supporting an electromagnetic receiver and transmitter and a cylindrical case attached thereto for enclosing a battery and leads to be attached to the meter. One known lid is formed of concrete and has a slot molded in its outer edge for holding the transponder. Another known lid is formed of plastic and has an annular cavity molded in its top surface with a small opening formed therethrough for receiving and supporting the transponder on the top side of the lid with the cylindrical case extending downward through the opening. Still another known lid is a plastic lid having an annular cavity integrally molded in its bottom side for receiving the disc of the transponder. A flat wall with a slot is attached to the bottom of the lid over the cavity after the disc is inserted into the cavity for holding and supporting the transponder disc in the cavity with its cylindrical case extending downward through the slot of the wall.

All of these prior art lids are built specifically to support transponders. Some cities, however, do not use these types of transponders and hence do not desire to use these prior art lids.

SUMMARY OF THE INVENTION

It is an object of the invention to provide a lid for a meter box that is built as a conventional lid which can be adapted to accept a transducer holder if desired. Thus a single type of lid can be used as a conventional lid or as a lid for supporting a transponder, and hence should be acceptable to either type of user. This results in a reduction in production costs and inventory.

In accordance with the invention the lid used is similar to that of a conventional lid in that no special cavities are formed in the lid. One known conventional lid is disclosed in U.S. Pat. No. 4,163,503 and Des. No. 257,133. A removable shelf or holder is provided that has a lower wall and a slot with a transverse side wall extending from the lower wall. The side wall is removably attached to the bottom of the lid with the lower wall hanging down to provide a cavity below the bottom of the lid to receive and hold a transponder.

In the embodiment disclosed, the holder is U-shaped with tabs that extend outward from opposite sides of the side wall. Holes are formed through the tabs for receiving coupling means for removably coupling the holder to the bottom side of the lid.

In one embodiment, bosses or studs with apertures extend downward from structure on the bottom side of the lid for receiving the coupling means.

DESCRIPTION OF THE PREFERRED EMBODIMENTS

Figure 1:
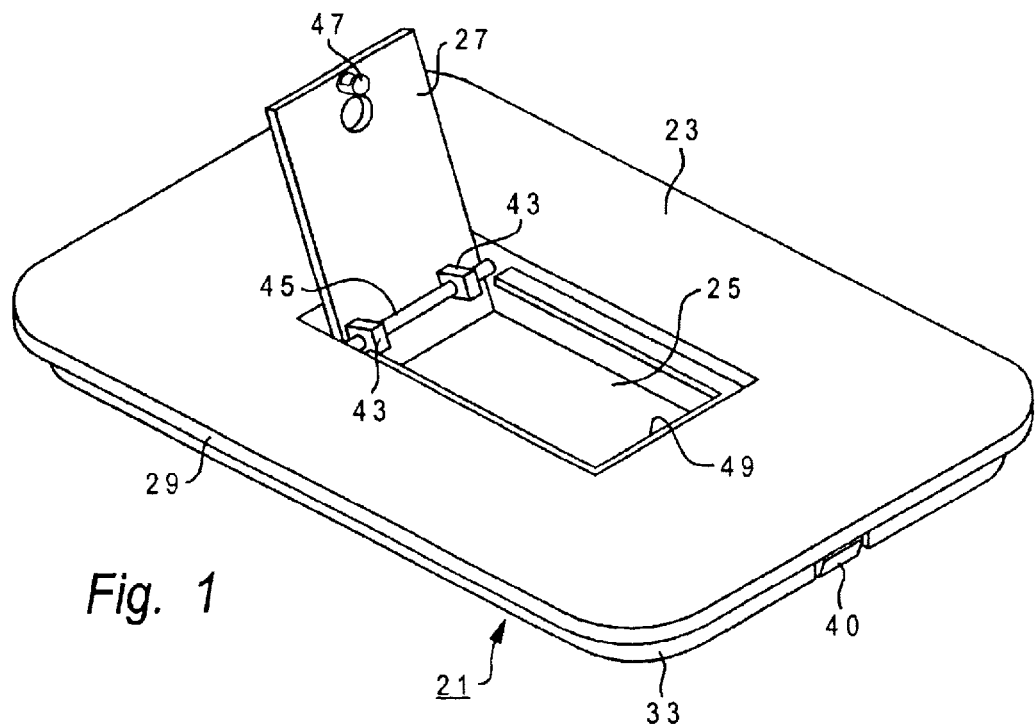
FIG. 1 is an isometric view of the top of a meter box lid with its door in an open position.
Figure 2:
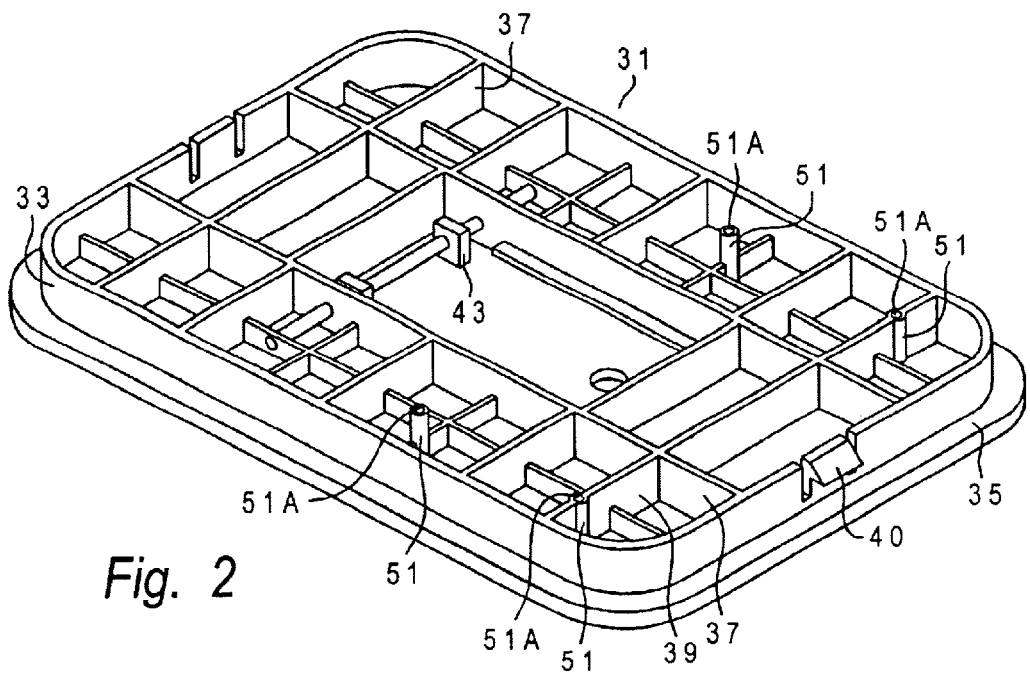
FIG. 2 is an isometric view of the bottom side of the lid of FIG. 1

Referring now to FIGS. 1–5 there is disclosed a lid 21 formed of plastic material. It has a generally flat rectangular top side 23 with an opening 25 formed therethrough and a door 27 that can be moved to a closed position as shown in FIG. 2 and to an open position as shown in FIG. 1. The lid 21 has a peripheral edge 29 and a bottom side 31 with a downward extending wall 33 spaced inward from the edge 29 defining a seating surface 35. Ridges or ribs 37 and 39 extend downward from the side 31 within the wall 33 for support purposes. Outer latches or hooks 40 are provided for latching the lid to the upper end of a meter box which may be of the type disclosed in U.S. Pat. No. 4,163,503. The door 27 is pivotally coupled to the lid by way of two hinge posts 43 connected to one end of the door and which can pivot about a rod 45 connected to the lid at one end of the opening 25 for allowing the door to pivot between open and closed positions. The opposite end of the door has a hook 47 to hook against a ridge 40 to hold the door in place. The purpose of the door is to allow a meter reading personnel to visually read the meter located within the walls of the meter box. In some municipalities, this type of meter reading is still used.

Figures 3, 4, 5:
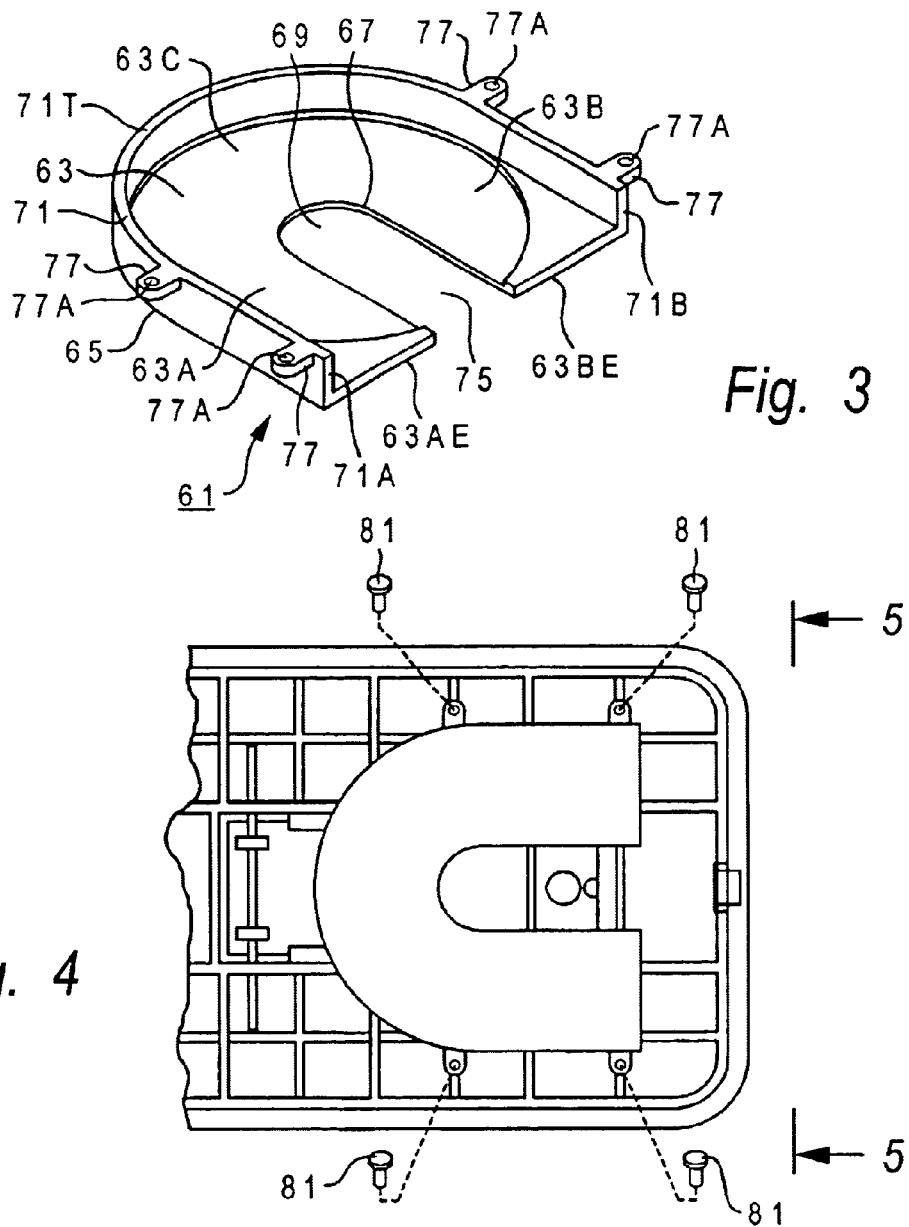
FIG. 3 is an isometric view of the top side of a holder or shelf to be attached to the bottom side of the lid of FIGS. 1 and 2.
FIG. 4 is a bottom plan view of a portion of the lid of FIGS. 1 and 2 with the holder of FIG. 3 attached to the lid.
FIG. 5 is an end view of the lid and holder of FIG. 4 as seen along lines 5—5 of FIG. 4.
Figure 6:
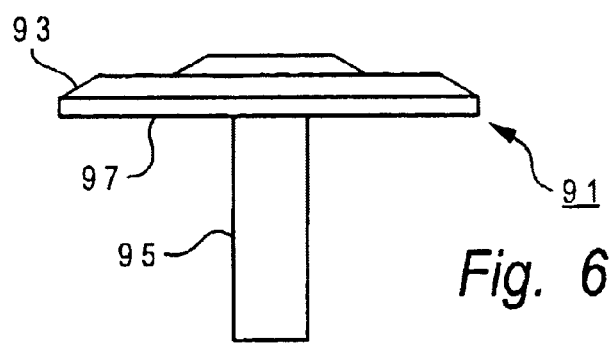
FIG. 6 is a side view of the exterior of a transponder.
Figure 7:
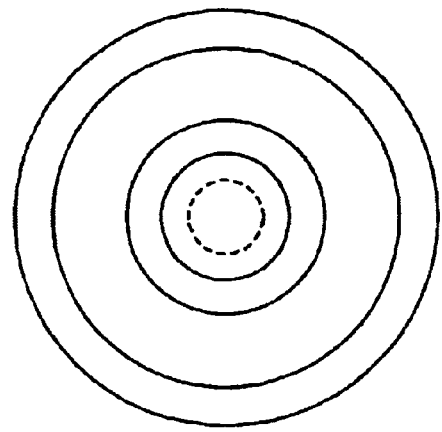
FIG. 7 is a top view of the transponder of FIG. 6.

The lid 21 also has four bosses or studs 51 with apertures 51A formed therein molded on the bottom side and extending downward for allowing a shelf or holder 61 of FIGS. 3–5 to be attached to the bottom side of the lid for holding a transponder 91 of the type showing in FIGS. 6 and 7 to allow meter reading to be carried out by personnel in a vehicle with the use of a mobile transponder. The four studs define the four corners of a rectangle. The transponder 91 shown comprises an annular disc shaped member 93 having a cylindrical shaped case 95 extending downward from the lower side 97 of the member 93.

The shelf 61 comprises a flat U-shaped bottom wall 63 which has two spaced apart wall portions 63A and 63B extending from a connecting portion 63C to two spaced apart edges 63AE and 63BE defining an outer edge 65 and an inner edge 67 with an opening 69 formed between wall portions 63A and 63B. A U-shaped side wall 71 extends upward from the outer edge 65 defining a cavity 73 with an entrance 75 formed between wall edges 71A and 71B. Four tabs 77 extend outward from the top edge 71T of the wall 71 at positions defining four corners of a rectangle which has the same dimensions of the rectangle defined by the four studs 51. The tabs 77 have apertures 77A formed therethrough.

The tabs 77 can be placed against the bosses 51 with the four tab apertures 77A aligned with the four stud apertures 51A respectively as shown in FIG. 4 and four screws 81 inserted through tab apertures 77A and screwed into stud apertures 51A to secure the top edge 71 of the holder 61 against the lower edges of the ribs 37 and 39 with the entrance 75 facing outward. This allows a transponder 91 to be located in the cavity 73 with its bottom side 97 supported by the wall 63 and its cylindrical case 95 extending downward through the opening 69.

Thus if the user does not use transponders of the type shown in FIG. 6 and 7 the lid of FIGS. 1 and 2 without the holder 61 can be provided and if the user uses the transponder of the type shown in FIGS. 6 and 7, the lid with the holder 61 attached thereto can be provided.

Figure 8:
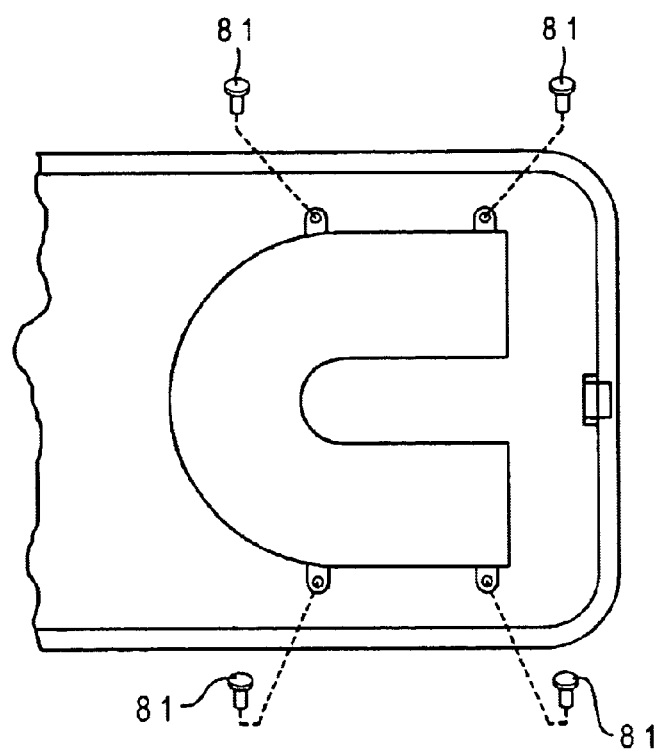
FIG. 8 illustrates the holder of FIGS. 3 and 4 attached to a solid lid.

Heavy duty solid plastic lids are now being produced which are relatively thick and do not have the support ridges as shown by the lid of FIGS. 1, 2, and 4. A portion of such a solid lid is shown in FIG. 8 at 101. The holder 61 may be used with such a lid by drilling four holes in the bottom side of the heavy duty lid to match the positions of the apertures 77A of the tabs 77 such that screws may be inserted through the apertures of the tabs and screwed into the drilled holes to locate the holder below the bottom side of the solid lid with the entrance 75 of the cavity 73 of the holder 61 facing outward and preferably next to one of the sides of the lid.

In one embodiment, the lids 31 and 101 and the holder 61 may be formed of a plastic material such as polyethylene or polypropylene.

In some cases, a lid may have two holders 61 attached thereto by screws for use for a single meter box covering two water meters. Each holder will hold a separate transponder each of which will be used to measure water flow through two pipes leading to two adjacent homes respectfully. Each transponder can be actuated separately to read each water meter separately.

What is claimed is:

1. A meter box lid comprising:

a top side, a bottom side and a surrounding edge to be coupled to the upper end of a meter box with said bottom side facing downward, a holding means for holding a transponder below said bottom side of said lid, comprising:

a bottom wall having an upper side and a lower side with first and second spaced apart wall portions extending from a connecting portion to first and second spaced apart edges respectively defining an outer edge extending from said first edge to said second edge and an inner edge extending from said first edge to said second edge, and an outer side wall extending from the upper side of said outer edge transverse to said first and second spaced apart wall portions and removably coupled to said bottom side of said meter box lid with said first and second edges and said outer side wall at said first and second edges defining a cavity with an entrance for receiving a transponder to be supported at least by said first and second spaced apart wall portions.

2. The meter box lid of claim 1, wherein:

said bottom wall is U-shaped having an opening extending between said first and second edges inward between said first and second wall portions for receiving a lower portion of the transponder when supported by said wall portions.

3. The meter box lid of claim 1, comprising:

a plurality of spaced apart lid apertures formed in structure of said bottom side of said lid, and a plurality of spaced apart apertures formed through structure of said holding means and which are aligned with said plurality of spaced apart lid apertures for receiving coupling means for removably coupling said holding means to said bottom side of said lid.

4. The meter box lid of claim 2, comprising:

a plurality of spaced apart lid apertures formed in structure of said bottom side of said lid, and a plurality of spaced apart apertures formed through structure of said holding means and which are aligned with said plurality of spaced apart lid apertures for receiving coupling means for removably coupling said holding means to said bottom side of said lid.

* * * * *